United States Patent [19]

Lynch

[11] Patent Number: 4,802,794
[45] Date of Patent: Feb. 7, 1989

[54] REEL TYPE MARINE PIPE LAYING APPARATUS WITH TENSION INDUCED PIPE STRAIGHTENING

[75] Inventor: Robert P. Lynch, Tulsa, Okla.
[73] Assignee: Lyntech Corporation, Tulsa, Okla.
[21] Appl. No.: 44,355
[22] Filed: Apr. 30, 1987
[51] Int. Cl.⁴ ............................ F16L 1/04; B21D 3/04
[52] U.S. Cl. .................................... 405/168; 405/158; 72/161
[58] Field of Search ............... 405/168, 166, 169, 170; 166/338, 340, 341; 72/161, 164, 183

[56] References Cited

U.S. PATENT DOCUMENTS 3,680,342 8/1972 Mott et al. ............... 405/168 X
3,855,835 12/1974 Tisdale et al. ............ 405/166 X
4,157,023 6/1979 Tisdale et al. ............ 405/168 X
4,594,871 6/1986 de Boer ..................... 405/168 X Primary Examiner—Dennis L. Taylor
Attorney, Agent, or Firm—Head & Johnson

[57] ABSTRACT

An apparatus for straightening pipe unwound from and at a point on a reel aboard a floating barge which has a stern and a stern roller supported by the barge. Tensioning means on the barge for applying tension to the pipe as it is unwound from the reel. The stern roller and the point on the reel defining a straight, tangent line with one and only one straightening roller member between the stern roller and the point on the reel. The barge has support means supporting the straightening roller member above the tangent line.

10 Claims, 3 Drawing Sheets

REEL TYPE MARINE PIPE LAYING APPARATUS WITH TENSION INDUCED PIPE STRAIGHTENING

BACKGROUND OF THE INVENTION

1. Field of the Invention:

The present invention relates to a method and means for laying a marine pipeline and more particularly, but not by way of limitations, to a reel upon which the pipe to be laid is wound and a straightening mechanism for straightening the pipe as it is unwound.

2. Prior Method:

Oil and gas marine pipelines are commonly laid on the bottom of the body of water. The most effective method for laying long links of pipeline in marine locations involves welding short sections of pipe together at a shore location and then coil them onto a barge mounted reel. The barge is them moved to the location at which the pipe is to be laid and the pipe is unwound from the reel. However, when winding the pipe onto the reel in the first place, the pipe metal yields in bending as it conforms to the reel surface. Therefore, the pipe must be yielded in the opposite direction or straightened as it is uncoiled from the reel for laying on the floor of the body of water. The straightening is accomplished by an arrangement of either two or three rollers which are configured to continuously stretch the pipe in bending in opposite directions within the plane of the coil thus effecting a continuous straightening of the pipe. The straightening rollers are typically located a distance from the reel so that the pipe will enter the rollers at a reasonably constant angle which is preferred to be normal to the roller axis and in a plane parallel to the axis of the rollers.

If the pipe is unwound from the bottom of the reel which has a horizontal axis, there is a tangent line from the bottom of the reel to a roller at the stern of the barge over which the pipe drops or leads into the body of the water. A first straightening or bending roller adjacent the reel deflects the pipe to a substantial distance above this tangent line. A second straightening roller is between the first straightening roller and the stern roller. This second straightening or reaction roller has a lower peripheral surface which is closer to the tangent line than is the surface of the pipe at the point of contact between the pipe and the surface of the first straightening roller. In this system static beam load theory is used to determine the various forces. The theoretical beam would be supportive at one end at the tangential point of the reel and at the other end by the support of the reaction roller. The downward force is at the first straightening roller caused by the pipe. This downward force in the beam theory is located a distance between the ends of the radiant beam which is determined by the position of the first straighening roller between the tangential point of the reel and the reaction roller.

When laying the pipeline, there is nearly always tension maintained on the pipe itself. This is obtained by having the pipe that is laid anchored to the sea floor and by applying the tension at the barge. The pipe goes over the stern of the barge and is shaped or held in a certain direction by use of a ramp, commonly referred to as a stinger.

SUMMARY OF THE INVENTION

This invention relates to a pipe straightening system for use with a pipe being unrolled from a reel mounted on a barge. This system of mine is much simpler than the prior systems. In my system I use only one straightening roller. The reel is mounted in the normal manner on the barge with pipe being taken off at a tangent point at the bottom of the reel. There is also a roller at the stern of the barge over which the pipe departs from the barge. Between the stern roller and the tangent point there is provided a bending roller. In order to define the position of this bending roller, reference is made to a tangent line which is a straight line extending from the takeoff point of the reel and extends over the top of and is tangential to the stern roler. The bending roller is raised up or positioned such that its top periphery is above the tangent line. The height of this roller can be adjusted. The pipe to be straightened comes off the reel then goes over the top of the bending roller and over the top of the stern roller. With this arrangement straightening of the pipe is obtained by a combination of forces caused by the bending roller and the tension on the pipe. The straightening or bending roller is mounted on a pedestal which is supported by a lateral transport carriage. A load sensing cell is incorporated between said pedestal and carriage so as to permit monitoring the load applied on the roller. By observing the load applied to the straightening roller in relation to the tension applied to the pipe and the straightness of the pipe; one can determine if the proper tension is applied and the height of the straightening roller is correct. By experimenting with the applied tension and height of the straightening roller one can apply correct forces to obtain a straight pipe.

In a preferred embodiment the straightening or bending roller is mounted on a transport carriage which is mounted on a base which incorporates tracks or slide surface with suitable actuating mechanism such as a motoring chain to drive the carriage in a lateral direction between the flanges of the pipe storing reel. This is so that the straightening sheave or roller can follow the position of the pipe as it unrolls. Means are provided to raise and lower the elevated base so that the bending or straightening sheave can be positioned to obtain the desired straightening effect in relation with the applied tension.

DETAILED DESCRIPTION OF THE PREFERRED EMBODIMENT

Figure 1:
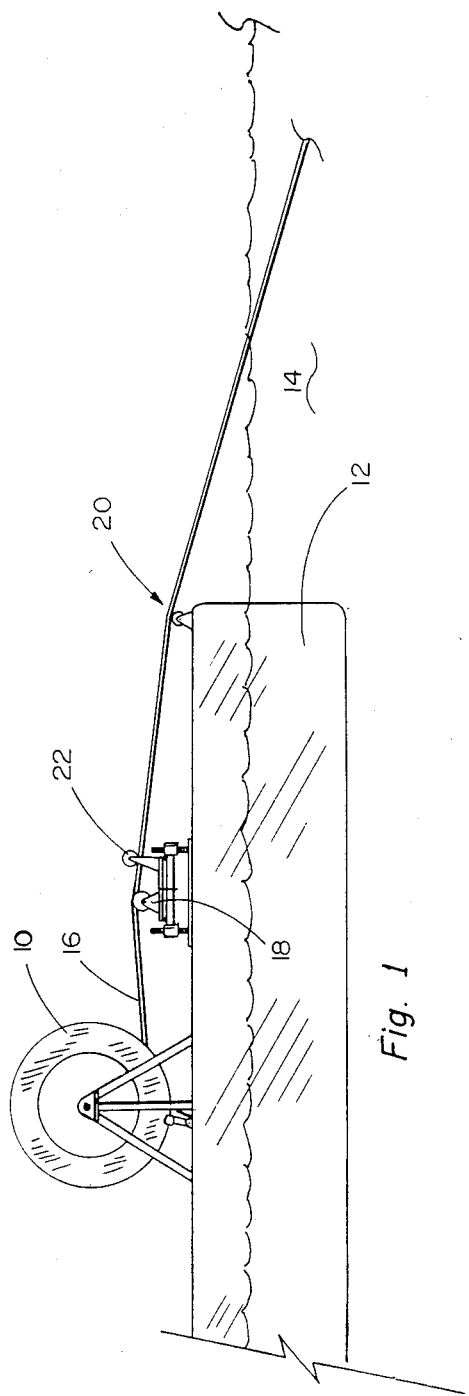
FIG. 1 is a schematic view of the pipe reel and straightening mechanism.

Attention is first directed to FIG. 1 which shows a pipe reel 10 mounted on barge 12 for loading on a body of water 14. Pipe 10 can be any large reel upon which a string of pipe has been wound. As shown in FIG. 1 pipe 16 is at a stage of being unreeled from reel 10. The pipe 16 extends up over straightening sheave 18 which is supported from the barge. The pipe extends over barge stern roller 20 and on down to the bottom of the body of water. These subsea pipe laying machines are well known. Also shown in FIG. 1 is a safety roller or sheave 22. This sheave is considerably above the pipe 16 and in normal operations is never in contact with the pipe.

However, it is merely there for a safety purpose. In the event the pipe should break this roller 22 would give some control on the pipe and prevent it from whipping around.

Figure 2:
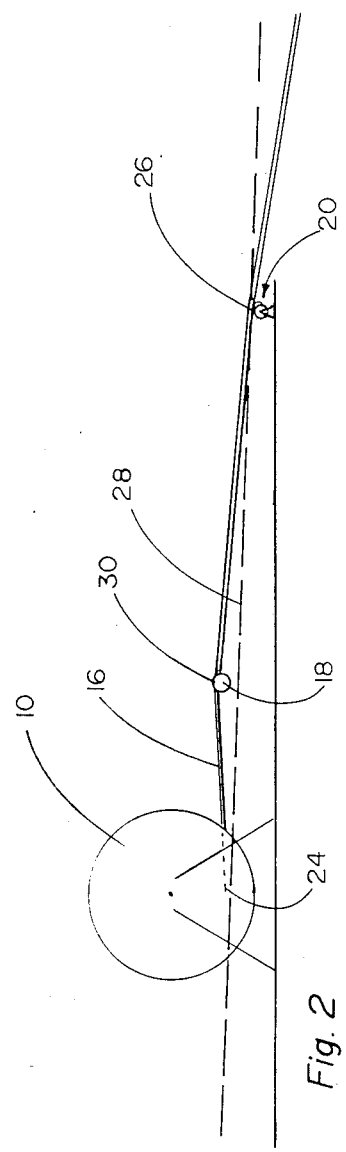
FIG. 2 illustrates the points of contact of the pipe in the straightening operation.

Attention is next directed to FIG. 2 which illustrates the geometrical positioning of key points. A first key point is reel point 24 which is the lower point where pipe 16 is being unwound from or leaves contact with reel 10. It is the lower side of pipe 16 at this position. A second critical point is the top point 26 of barge stern roller 20. A straight line drawn between these two points is tangential line 28. The top point 30 of straightening sheave 18 is above tangent line 28. I have found that by maintaining adequate tension on pipe 16 and having point 30 properly positioned above tangent line 28 that I can obtain the effect of reverse bending of the pipe being discharged and thus effect the straightening of the pipe.

Figure 3:
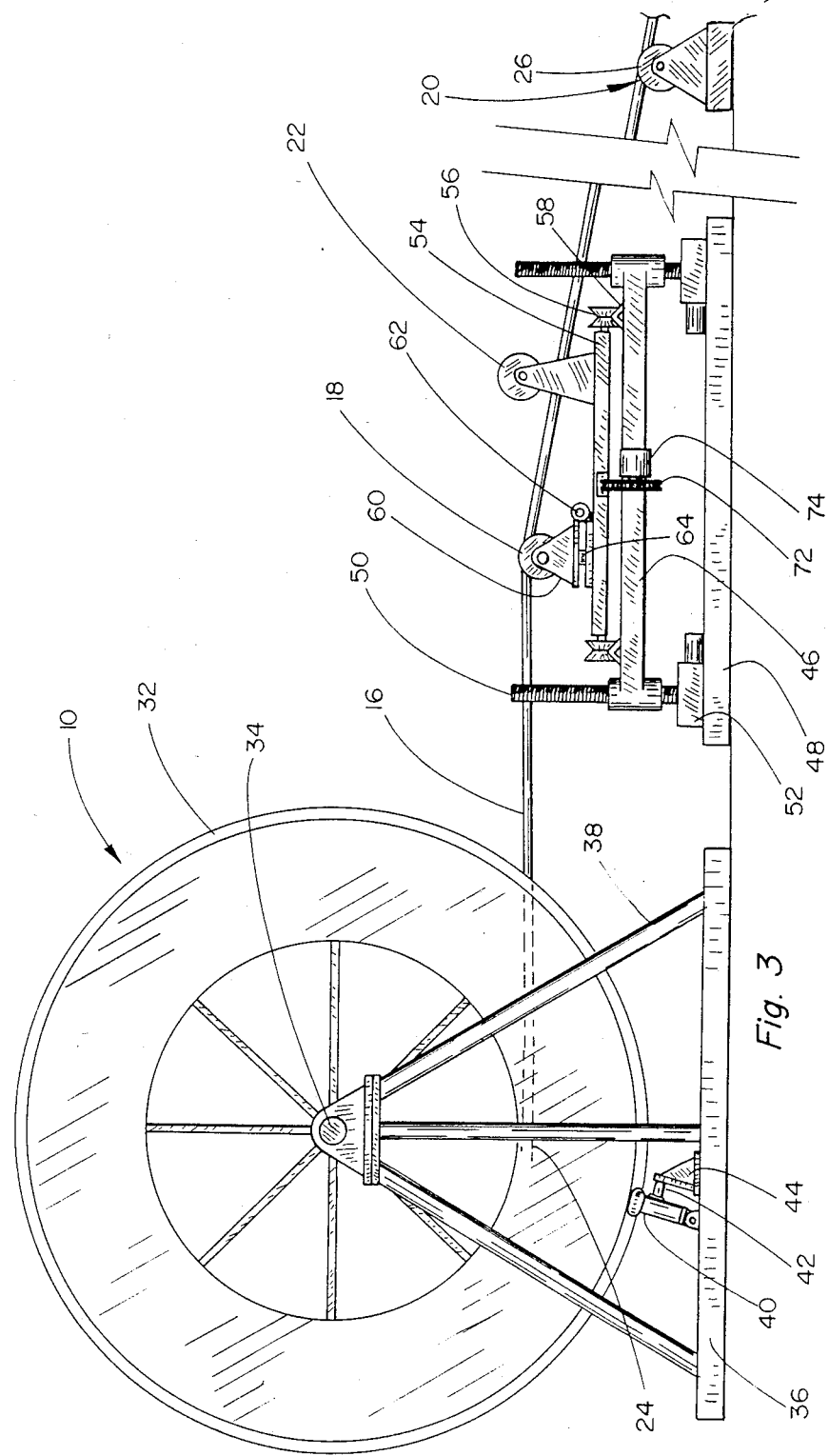
FIG. 3 is a more detailed view of the pipe straightening mechanism.

Attention is now directed to FIG. 3 to show in more detail the reel and straightening mechanism. Shown in FIG. 3 is the reel 10 with a brake flange 32. The axle 34 of the reel 10 is supported from base 36 by braces 38, in any well known manner to give the reel stability on the barge. The reel 10 has a brake flange 32. A disc brake caliper 40 is mounted from base 30. A load sensing cell 42 is supported between bracket 44 and the disc brake caliper 40. The disc brake caliper 40 may be hydraulically operated and operation of this disc brake caliper 40 as the barge is moving will control the amount of tension on pipe 16. The load sensing cell 42 indicates the tangential component of the braking action. The value of this reading can be either visual form, recorded or fed to a computer.

Attention will now be directed toward the straightening sheave 18 and how it is supported. An elevating base 46 is supported above fixed base 48 which is attached to and supported by the barge. This elevating base is supported by four jack screws 50 as more clearly shown in FIG. 4. Jack screw drive 52 rotates the jack screws 50 to raise or lower the elevating base 46. Other lifting jacks such as hydraulic means can be used. The raising and lowering of this elevator base 46 positions the straightening sheave 18 at the proper height as discussed above in regard to FIG. 2. A lateral transport carriage 54 is supported from elevating base 46. A preferred way of doing this is V-shaped rollers 56 which are attached to the carriage 54 and are fitted over V rails 58. Thus as elevating base 46 is raised or lowered the transport carriage is also raised or lowered. The straightening roller 18 is preferably a grooved rubber lined sheave. However, it could also be a simple, cylindrical roller. The straightening sheave 18 is mounted on a hinged bracket 60 which is hinged at pivot point 62. A load cell 64 is between the bracket 60 and the carriage 54. At any time a readout can be taken from this load cell 64 so that one would readily know the force of pipe 16 on straightening sheave 18. As pipe 16 is unwound the point 66 at which the pipe 16 comes off the rail moves back and forth across the periphery of the reel between sides 68 and 70. Means are provided so that straightening sheave 18 will follow this point 66 as it progresses between sides 68 and 70. A drive chain 72 with motor 74 is provided. The motor 74 can be operated by hand so as to keep the sheave 18 properly aligned. Alternatively, means, not shown, can be provided to synchronize the movement of transport carriage 54 with the unreeling of the pipe 16. Alternatively, instead of straightening sheave 18 one may use an elastometer covered cylindrical roller which has a length equal to the width of the reel. The roller would be raised or lowered similarly to that used for the sheave 18, the axis of the roller would correspond to the axis of the sheave.

Figure 4:
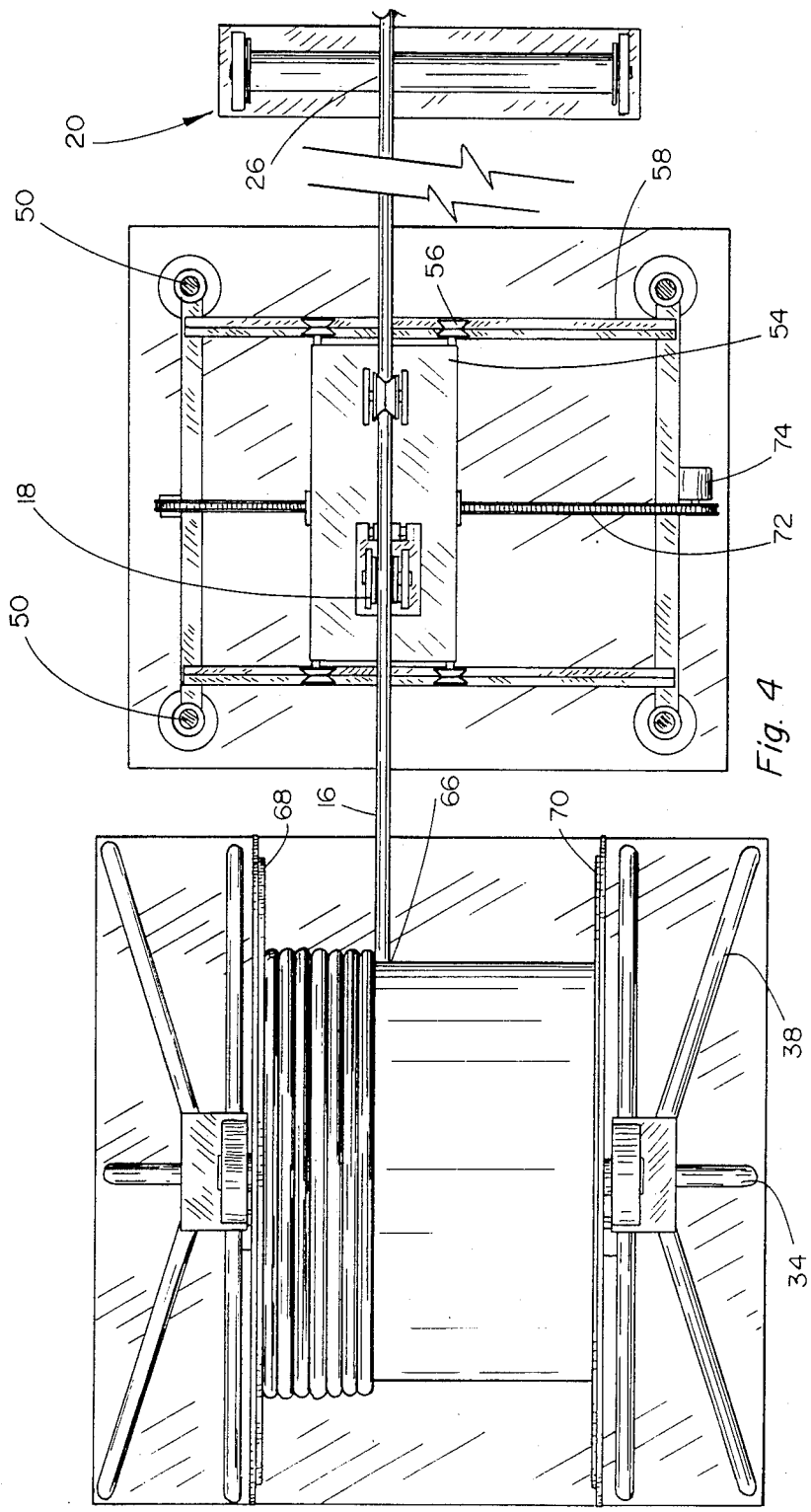
FIG. 4 is a top view of the view of FIG. 3.

Also shown in FIGS. 3 and 4 is a safety roller 22 which is incorporated adjacent to the straightening roller 18. It is positioned so as to be on the opposite side of the pipe as said bending or straightening roller. In normal operations, the safety roller will be above pipe 16 and make no contact with it and serves no function during the straightening process. The safety roller 22 is provided to prevent the pipe 16 from jumping out of the straightening roller or sheave 18 in the event that the tensioning in the pipe was actually reduced or the pipe separated.

In operation, a reel 10 loaded with pipe wound about its periphery is loaded on the barge as indicated in the drawings. When it is desired to lay the pipeline the pipe 16 is normally laid in the bottom of the body of water. The unrolling of the reel 10 is synchronized with the underwater pipe laying machine. As the pipe 16 is unrolled from the reel 10 it must be straightened. This is accomplished by maintaining the pipeline 16 in a sufficient magnitude of tension to effect the reverse bending of the pipe being discharged by passing the pipe over the single roller 18. Thus the pipe downstream from straightening sheave 18 has been essentially straightened. As taught above in regard to FIG. 2 the straightening sheave 18 has to be above the tangent line 28 so that the pipe will be slightly offset. The load cell 64 can be monitored to keep a close tab on the force exerted on the straightening sheave 18. Likewise, the load sensing cell 42 can be monitored to keep close track of the amount of tension. I have found that the exact positioning of the straightening roller 18 along the deck of the barge is not too critical except that it must be between the tangent point of the reel and the barge stern roller 20. The main criteria appears to be the amount of the tension applied to the pipeline and the vertical displacement of the straightening roller 18 above the tangent line 28. I have found that if I raise straightening sheave 18 to the proper elevation this displacement combined with fairly high tension on the pipe 16 that I obtain straightening of the pipe. The tension frequently held on pipe being laid may be in the order of twenty to sixty thousand pounds, although it can be more or less.

While the invention has been described with a certain degree of particularlity, it is manifest that many changes may be made in the details of construction and the arrangement of components without departing from the spirit and scope of this disclosure. It is understood that the invention is not limited to the embodiments set forth herein for purposes of exemplificaton, but is to be limited only by the scope of the attached claim or claims, including the full range of equivalency to which each element thereof is entitled.

What is claimed:

1. An apparatus for straightening pipe unwound from and at a point on a reel aboard a floating barge which has a stern which comprises:

a barge stern roller supported by the barge;

tensioning means for applying tension to said pipe as it is unwound from said reel;

said stern roller and said point on said reel defining a straight, targent line;

one and only one straightening roller member between said sern roller and said point on said reel;

support means supporting said straightening roller-member above said tangent line.

2. An apparatus as defined in claim 1 in which said roller member is a straightening sheave and said support means includes:
a lateral transport carriage supporting said straightening sheave;
an elevating base for supporting said lateral transport carriage;
means to raise and lower the elevating base with respect to the deck of said barge; and
means to move said transport carriage across said elevating base laterally with respect to said pipe.

3. An apparatus as defined in claim 1 in which said tensioning means includes brake means for applying force to said reel to impede its pipe unreeling rotation.

4. Apparatus as defined in claim 2 in which said tensioning means includes a brake flange on said reel and disc brake caliper in contact therewith, said disc brake caliper being supported from the barge; a bracket supported from said barge and a load sensing cell between said bracket and said brake caliper.

5. An apparatus as defined in claim 4 including a pivot for pivotally supporting said straightening sheave from said lateral transport carriage and a load cell between said sheave and said transport carriage.

6. An apparatus as defined in claim 1 in which said straightening roller member is an elastomeric covered cylindrical roller.

7. An apparatus as defined in claim 4 including a safety roller positioned at a higher elevation, with respect to the lateral transport carriage, than the said straightening sheave such that in normal operations it will not contact the pipe being straightened.

8. A method of straightening pipe that has been wound about a reel which is supported on a floating barge on a body of water which comprises:
unwinding the pipe from said reel at the bottom thereof at a reel point;
providing a stern roller;
defining a straight tangent line between the stern roller and the reel point on the reel at which the pipe is unwound;
raising the pipe by forcing it up by contact at a single point, and only at said single point, so that said pipe is above said tangent line between said barge stern roller and said reel point;
unwinding the pipe while maintaining tension thereon and having the pipe at said single point raised above said tangent line and while applying no downward force on said pipe between said barge stern roller and said reel point.

9. A method of straightening pipe that has been wound about a reel which is supported on a floating barge on a body of water which comprises:
unwinding the pipe from said reel at the bottom thereof at a reel point;
providing a stern roller;
defining a straight tangent line between the stern roller and the reel point on the reel at which the pipe is unwound;
raising the pipe by forcing it up at a single point, and only at said single point, above said tangent line between said barge stern roller and said reel point;
determining upward force applied at said single point and using such determination to determine the height to raise the pipe;
unwinding the pipe while maintaining the tension thereon and having the pipe at said single point raised to said height above said tangent line.

10. A method as defined in claim 8 in which the tension on said pipe is at least 20,000 pounds.

* * * * *